United States Patent [19]

Arao et al.

[11] 4,345,517
[45] Aug. 24, 1982

[54] JUICE EXTRACTOR

[75] Inventors: Yuzuru Arao, Takatsuki; Katsufumi Nishio, Toyonaka; Masashi Mikami, Osaka; Toyoaki Murasawa, Nishinomiya, all of Japan

[73] Assignee: Matsushita Electric Industrial Co., Ltd., Osaka, Japan

[21] Appl. No.: 40,735

[22] Filed: May 18, 1979

Related U.S. Application Data

[62] Division of Ser. No. 849,480, Nov. 7, 1977, abandoned.

[30] Foreign Application Priority Data

Nov. 16, 1976 [JP] Japan .................................. 51-138159
Nov. 16, 1976 [JP] Japan .................................. 51-154383
Nov. 16, 1976 [JP] Japan .................................. 51-154384
Nov. 17, 1976 [JP] Japan .................................. 51-138920

[51] Int. Cl.³ .......................... A23N 1/02; B04B 5/00
[52] U.S. Cl. ........................................ 99/511; 99/513
[58] Field of Search ................. 366/197, 200; 99/348, 99/509–513, 456, 495, 503; 210/369, 280 R; 233/1 E; 100/116, 125, 156

[56] References Cited

U.S. PATENT DOCUMENTS

| | | | |
|---|---|---|---|
| 2,343,327 | 3/1944 | Reynolds | 99/511 |
| 2,527,695 | 10/1950 | Bennett | 99/511 |
| 3,085,606 | 4/1963 | Moline | 99/511 |
| 3,924,838 | 12/1975 | Waniishi et al. | 366/200 |

FOREIGN PATENT DOCUMENTS 705001 3/1954 United Kingdom .................. 99/511

*Primary Examiner*—Philip R. Coe
*Assistant Examiner*—Timothy F. Simone
*Attorney, Agent, or Firm*—Cushman, Darby & Cushman

[57] ABSTRACT

A juice extractor comprising a high-speed rotatable centrifuge basket having a filter in the shape of an inverted frustum of a cone with an open top of larger diameter than the base which is a pot part with cutting teeth on its substantially flat inner bottom face and connected to the base of said filter and a food feeding duct situated substantially perpendicular to and over a portion of the bottom face, wherein the peripheral wall of the pot part is constructed in a manner that the top edge of the wall is situated at a higher position than the bottom face and the lower end of the food feeding duct; the wall of the pot part diverges slightly with its generator having an angle $\alpha$ of $0° < \alpha < 10°$ with respect to the axis of the rotation of the food basket.

14 Claims, 19 Drawing Figures

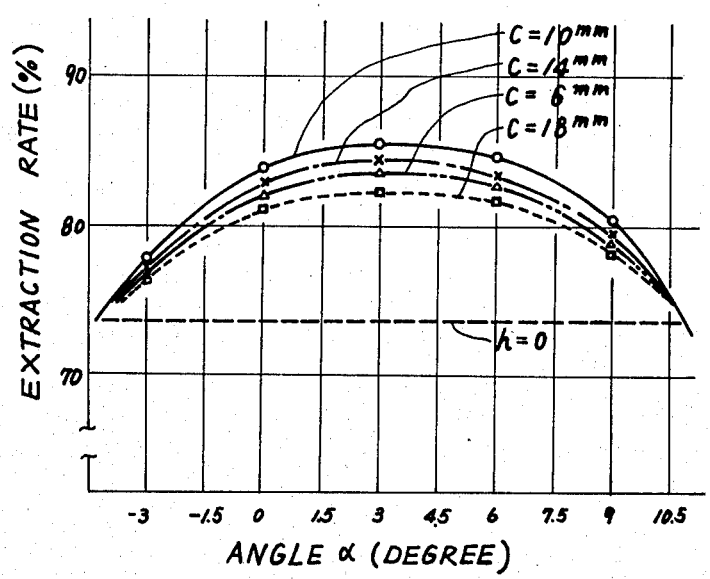
FIG. 11. (APPLE)
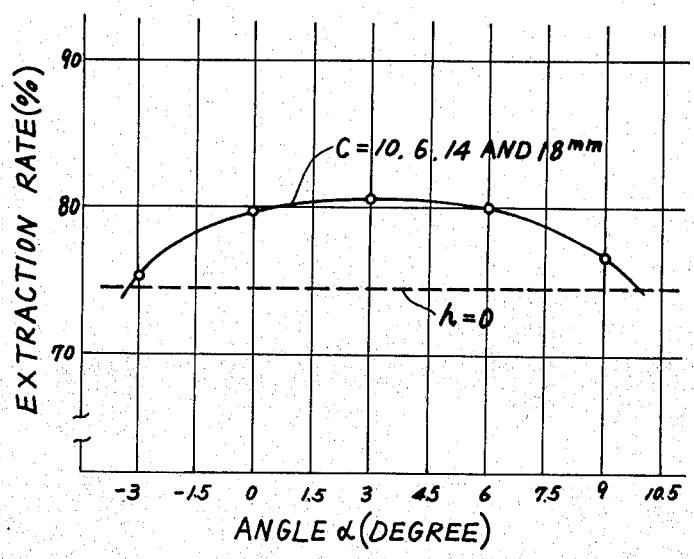
FIG. 12. (ORANGE)

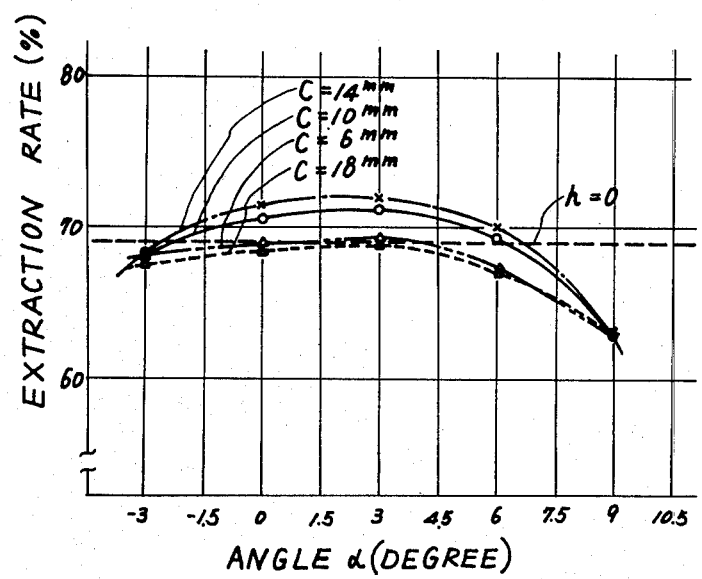
FIG. 13. (CABBAGE)
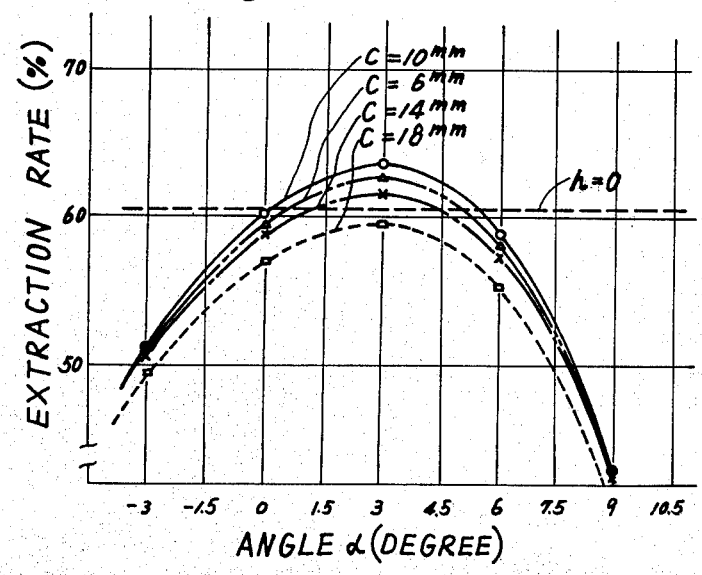
FIG. 14. (CARROT)

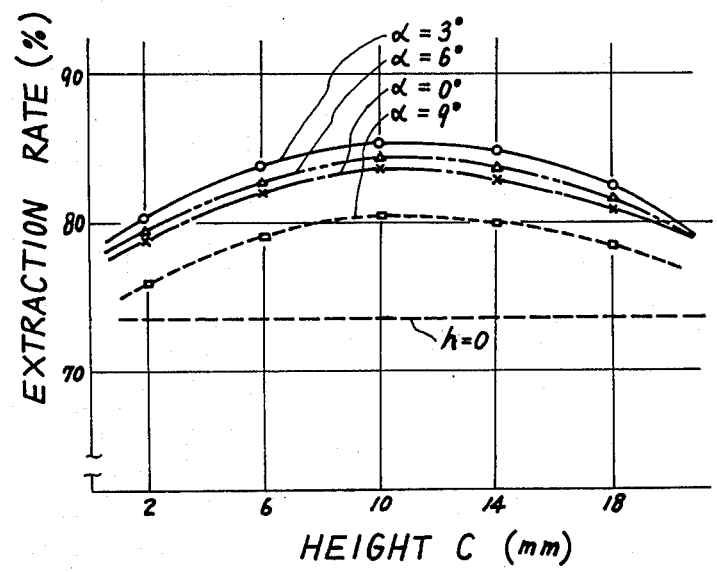
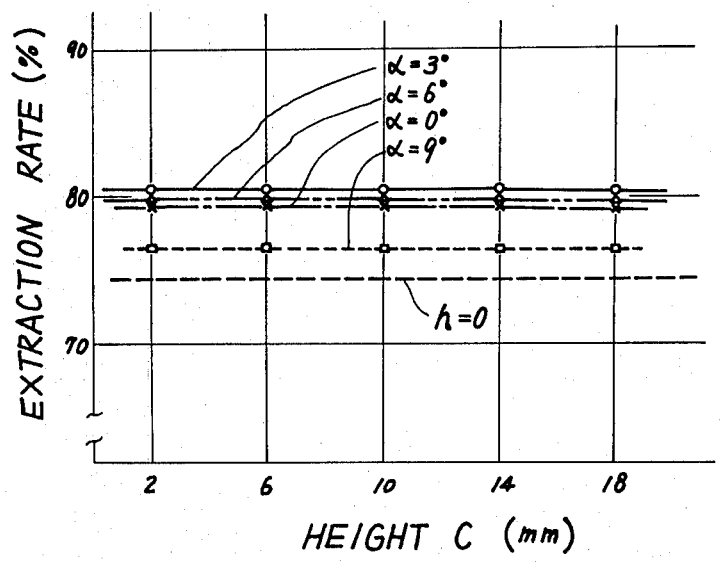

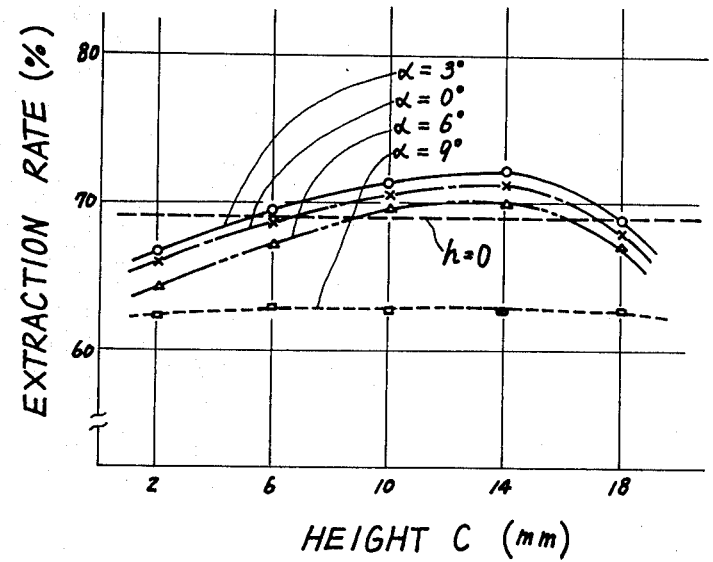
FIG.17. (CABBAGE)
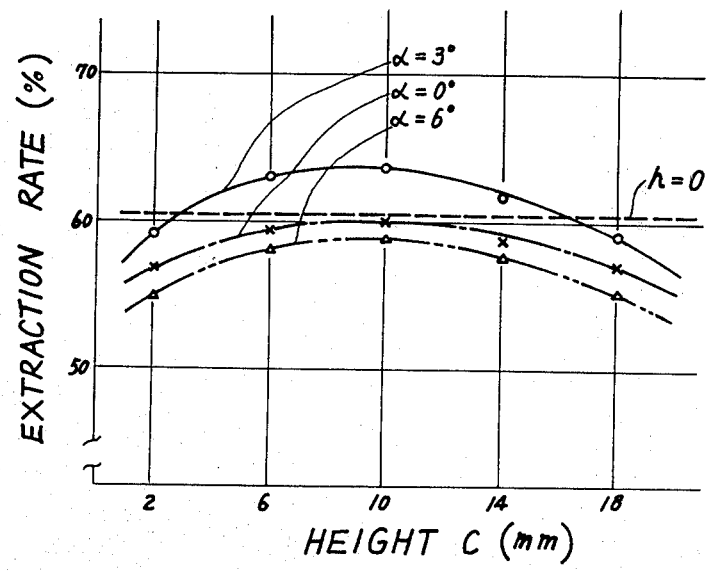
FIG.18. (CARROT)

JUICE EXTRACTOR

This is a division of application Ser. No. 849,480 filed Nov. 7, 1977 abandoned.

BACKGROUND AND SUMMARY OF THE INVENTION

This invention relates to an improvement in fruit and vegetable juice extractors of the type wherein the fruit and vegetables or the like are grated or ground and centrifuged for separation of the juice from the pulp or solid part.

One of such juice extractor is described in the specification of the U.S. Pat. No. 2,343,327, which discloses:

A fruit and vegetable juice extractor comprising a rotary food basket mounted on a substantially vertical axis of rotation and having an annular concentric perforated side wall and a bottom wall and adapted to receive ground food such as fruits and vegetables and the like adjacent the bottom thereof, means to deliver food to be ground to said bottom wall, means for rotating said basket about its axis at a high velocity of several thousand revolutions per minute to effect a centrifugal movement of the ground food outwardly against the lower part of said wall, the lower part of said wall being formed with a shoulder to receive and break up the ground food centrifugally thrown thereagainst, the remainder of said wall sloping upwardly and outwardly from said shoulder to facilitate the upward travel of the ground food thereover in a relatively thin layer, and juice collector means surrounding said wall and adapted to receive the juice centrifugally expelled through said wall.

In such a conventional juice extractor, the food grated by the cutting teeth on the inner bottom face of the inverted frusto-conical rotatable basket slides on the inner bottom face by the centrifugal force radially to the low vertical shoulder part of the filter net and then upwardly on the frusto-conical filter part. Since the height of the vertical shoulder part is very small compared to the filter part of the wall, the ground mixture of the juice and the pulp are driven smoothly and quickly towards the frusto-conical filter part. Therefore, the mixture of the juice and pulp travels too fast toward the peripheral part of the basket, and hence a considerable amount of the juice flows together with pulp away from the upper periphery of the basket, with the juice not being effectively extracted from the pulp, thereby resulting in a relatively low extraction ratio.

The present invention provides a juice extractor with a frusto-conical centrifugal basket capable of attaining a higher juice extraction ratio. This is achieved by relative dimensioning of the basket's pot wall and the pressing member's bottom and the angle of the wall to reduce the speed with which the pulp passes to and over the filter.

BRIEF DESCRIPTION OF THE DRAWINGS

FIGS. 11, 12, 13 and 14 are graphs showing empirical tests of the relation between the generator angle of FIG. 8 and extraction for various foods, the parameters being the heights C and h of FIG. 8.

FIGS. 15, 16, 17 and 18 are graphs showing empirical tests of the relation between the height C of FIG. 8 and the extraction rate for the various foods, the parameter being the generator angle to the axis of the basket in degree.

DETAILED DESCRIPTION OF THE INVENTION

Referring to the accompanying drawing, a preferred example embodying the present invention is elucidated in detail hereafter.

Figure 1:
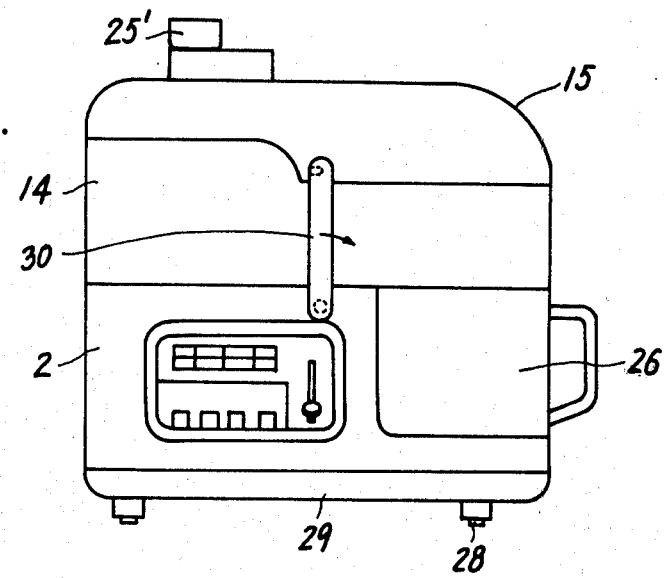
FIG. 1 is a front view of a juice extractor embodying the present invention.
Figure 2:
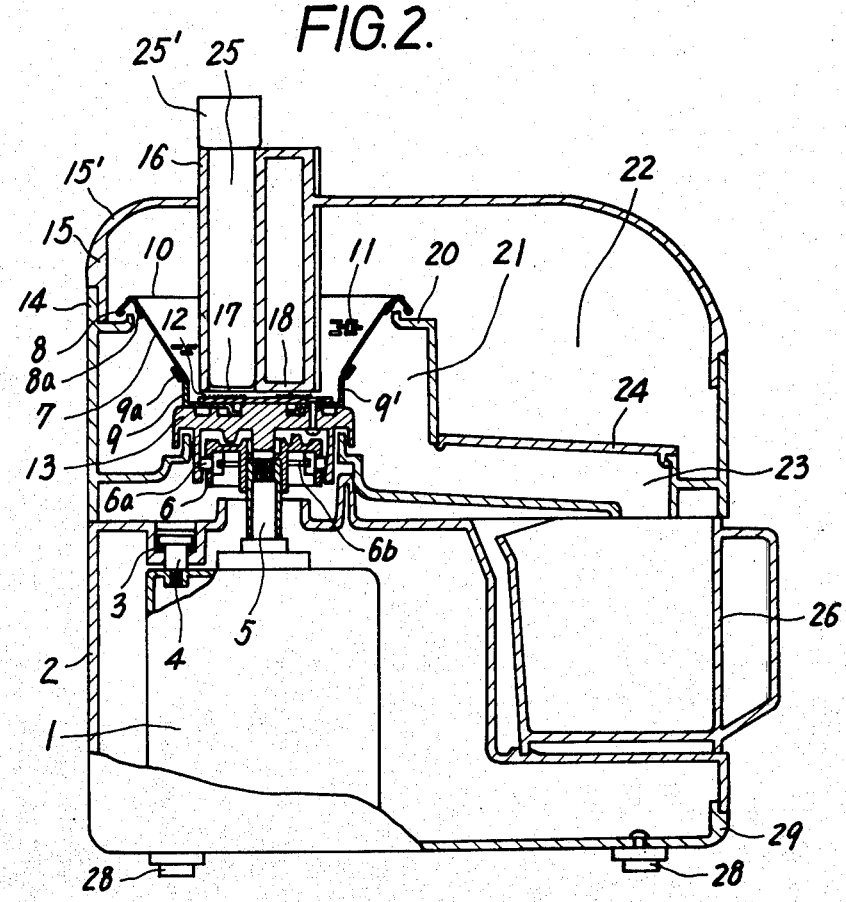
FIG. 2 is a sectional elevation view of the juice extractor of FIG. 1.

FIGS. 1 and 2 show general construction of the juice extractor of the preferred example, wherein in a housing 2, an electric motor 1 is held, by means of a suitable number of bolts 4 and rubber cushions 3, with its drive shaft 5 extending vertically upwards. The body case 2 has a bottom plate 29 and stand points 28, 28 secured thereto. To the top of the shaft 5, a rotatable table 6 is secured with horizontally spring biased clutch pins 6a, the springs being indicated at 6b. A base 13 of a rotatable basket 10 is detachably and coaxially received on the rotatable table 6, and is clamped by the clutch pins 6a in order to attain stable clamping suitable for high speed rotation of the basket 10 on the rotatable table 6.

The rotatable basket 10 comprises an inverted cone-frustum shaped filter 7 with a large number of small perforations. A pot part 9 is connected at the bottom of the filter 7, and a ring shaped reinforcing flange 8 is connected at the top part of the filter 7. On the inner face of the bottom plate of the pot part 9 is secured a cutter plate 12 having a number of raised cutting teeth thereon.

Figure 3:
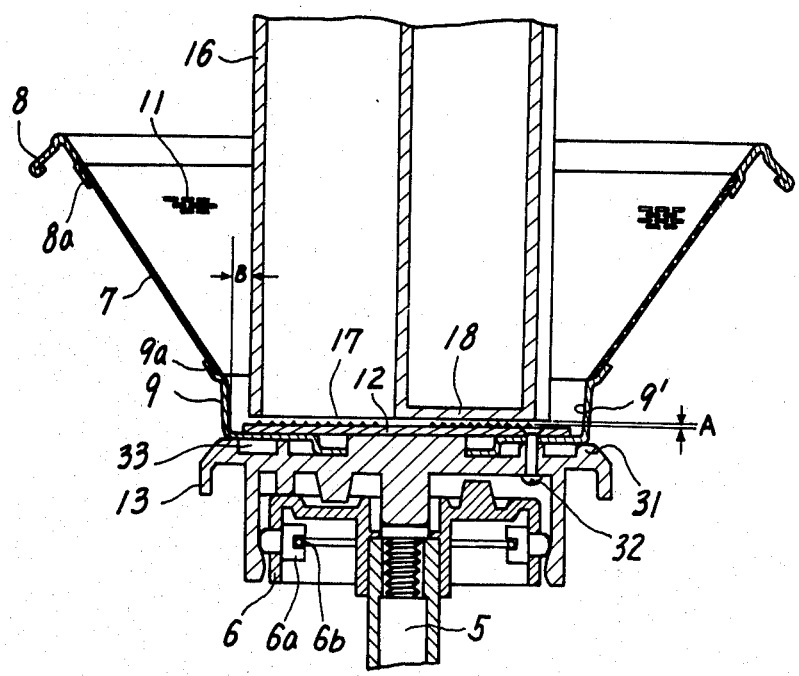
FIG. 3 is an enlarged partial sectional elevation view of a basket and relative parts.
Figure 4:
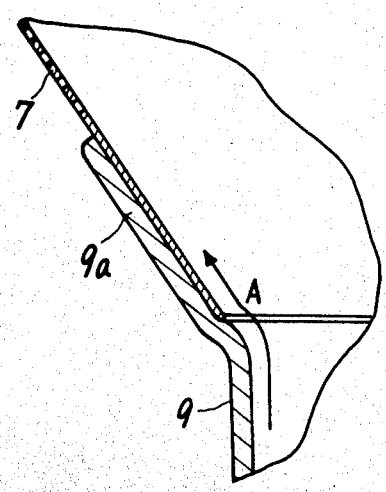
FIG. 4 and FIG. 5 are schematic enlarged partial sectional elevation views of the basket with arrows A and B indicating smooth flows of ground mixture of juice and pulp of the fruit or vegetable.
Figure 5:
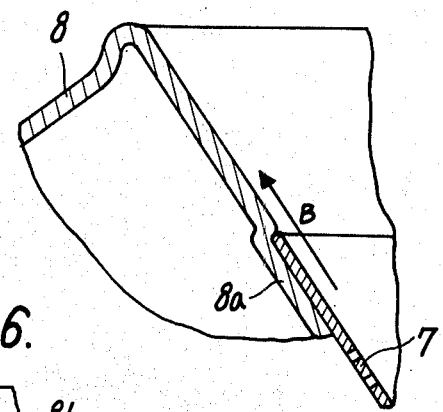
Figure 7:
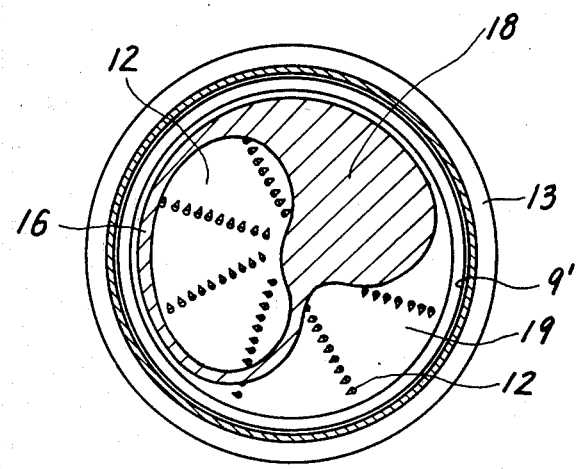
FIG. 7 is an enlarged sectional plan view of a basket and a food feeding duct and a related member.

Details of the rotatable basket 10 and relative parts are shown in FIGS. 3 and 7, wherein the connecting parts of the filter 7 to the pot part 9 and the flange 8 are shaped to have offset parts 9a and 8a, respectively, in order that the inner face of the basket 10 is substantially smooth or flush at the connecting lines. The pot part 9 has a substantially flat inner bottom face and a substantially vertical but slightly upward-diverging peripheral wall. The cutting teeth 12' on the substantially flat cutter plate 12 are disposed in a plan view (FIG. 7) in a manner that the teeth at the same radius from the axis of the drive shaft lagging the more behind the teeth located at a larger radius with respect to the direction of the rotation, so that ground food is easily driven radially toward the peripheral wall.

The pot part 9 is made by a press work of a metal plate and is mounted on the base 13 which has a slightly raised circular protrusion at peripheral part 31. The base 13, the pot part 9 and the cutting plate 12 are assembled and fixed in one unit by caulking rivets 32. Since the peripheral part 31 of the base 13 is slightly raised relative to the other parts of the base 13, the inner peripheral part of the pot part 9 is bent to accommodate raised area 31. Accordingly, the peripheral underside of the cutting plate 12 tightly contacts the inner face of the bent pot part 9, thereby assuring a water-tight engagement. In order to achieve a water-tight fit, other constructions are, of course possible, such as forming a raised ring part on the inner face of the pot part 9 and under the periphery of the cutting plate 12.

Referring to FIGS. 1 and 2, an upper case 14 is mounted on the housing or case 2, and an inverted bowl shaped cover 15 is placed on the upper case 14. A ring shaped shelf 20 is formed in the upper case 14 so as to be situated under the flange 8 in a manner to receive the pulp discharged out of the basket 10. The sump space 22 is for receiving the pulp discharged from the rotating basket 10. The top part of the cover 15 is rounded and the curvature over the sump space 22 is reduced, namely, has a larger radius of curvature than over the opposite side, so that the pulp can smoothly flow down into the sump space 22. Since the sump space 22 is formed under the reduced curvature part of the cover 15, and the contact line between the cover 15 and the upper case 14 is vertically lower in the region of the sump space 22, the upper case 14 can be made compact. Since the contact line around the sump space 22 is vertically lowered, the inner face of the cover of the sump space to which the pulp sticks can be removed and washed easily.

Figure 8:
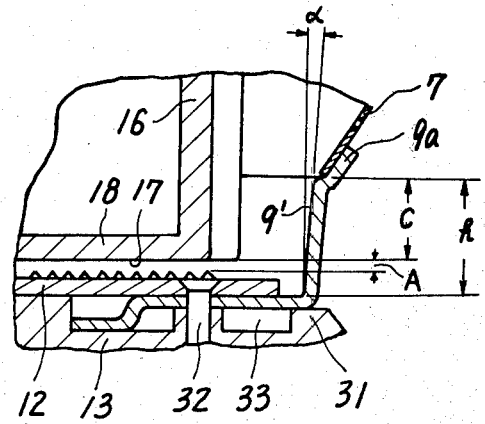
FIG. 8 is an enlarged partial sectional elevation view of a part of the basket.

The cover 15 has a food feeding duct 16, the lower edge of which is situated over the cutting plate 12 with a specified narrow gap inbetween. A pressing member 18 is formed integrally with the food feeding duct 16 in the down stream position of the food feeding duct 16 with respect to the rotation of the basket 10, as shown in FIG. 3 and FIG. 7. An open space 19 is formed in the downstream position of the pressing member 18. The gap A (shown in FIG. 8) between the bottom of the pressing member 18, which is flush with the lower edge of the food feeding duct 16, and the upper tips of the teeth 12' is selected smaller than the height h of the peripheral wall of the pot part 9, and one example of the gap A is 1 mm or smaller; the peripheral gap B (FIG. 3) between the outer side faces of the feeding duct 16 and the pressing member 18 and the inner peripheral wall 9' of the pot part 9 is made larger than the gap A, so as to easily discharge the ground food upwardly therethrough.

The aforementioned circular shelf 20 (FIG. 2) separates a juice collecting space 21 from the pulp sump space 22. The juice collecting space 21 is connected to a drain 23, under which a receiving cup 26 is placed. A detachable wall 24 is provided on the drain 23, so that the inner side of the drain 23 can be easily cleaned by removing the detachable wall 24. A pressing rod 25 is for pressing the food down in the feeding duct 16 and has a widened head 25' so that the lower tip of the rod 25 is situated with a specified gap of, for example 1.5 mm, over the cutting plate 12 when the rod 25 is pressed down to its lowest position.

By connecting the motor to an electric supply, the motor 1 rotates at a high speed, for example 11,500 rpm, thereby rotating the rotatable table 6, hence transmitting the rotation through the base 13 to the basket 10.

Then, food such as fruit or vegetable is fed into the feeding duct 16, and is pushed down on the cutting plate 12. The food is ground by the rotating rows of teeth 12' and the pressing member 18, and the ground food which is a mixture of juice and pulp, is released in the open space 19 on the cutting plate 12 and then sent by centrifugal force to the peripheral wall 9' of the pot part 9. The ground food collides with the peripheral wall 9' and loses momentum and motion. Then, successive amounts of ground food collide also by centrifugal force with the peripheral wall 9' of the pot part 9 and push the previously deposited food out of the pot part 9 onto the filter 7, where the juice is filtered away by the centrifugal force into the juice collecting space 21 and sent to the receiving cup 26 through the drain 23. The pulp is sent outward on the filter 7 by a component of the centrifugal force and discharged from the flange 8 into the sump space 22.

Since the filter 7 is connected by spot welding at the offset part 9a and 8a of the pot part 9 and the flange part 8, respectively, as shown in the example of FIGS. 2, 3, 4 and 5, the inside face of the basket 10 is substantially smooth. Therefore, the pulp coming out of the pot part 9 smoothly travels on the filter 7 and to the flange part 8 as shown by the arrows A and B of FIGS. 4 and 5. Such smoothly finished interior of the basket is advantageous in that the pulp is not retained at the connecting part, and hence there is little danger of pulp being caught by the connecting part. Accordingly, an adverse vibration due to eccentric catching and loading of such pulp is entirely eliminated and the cleaning of the basket is easy.

Figure 6:
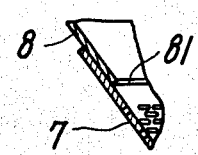
FIG. 6 is a schematic enlarged partial sectional elevation view of the basket of a modified construction.

However, in case a very high rate of juice extraction is required, a slight step at the upper periphery of the filter 7 is helpful. For example, by connecting the flange 8 on the inside face of the filter 7 thereby forming a shallow step 81 as shown in FIG. 6, a certain small amount of pulp piles under the step 81. The small amount of the piling of pulp functions to impede the juice flowing out of the filter 7, and enables the juice to be filtered effectively into the juice collecting space 21 instead of being wasted.

Since the cutting teeth 12' are disposed in a manner that radial rows of the teeth are staggered as described above and as shown in FIG. 7, to form a centrifugally pushing force by the staggered rows, the food ground by the teeth is, by cooperation with the centrifugal force, smoothly driven radially toward the peripheral wall 9'. Therefore, the ground food arriving at the peripheral wall 9' of the pot part 9 is continuously pushed away toward the filter 7 by the subsequently arriving ground food.

Since the peripheral gap B (in FIG. 3) between the inner side peripheral wall of the pot part 9 and the outer side face of the feeding duct 16 and the continuous pressing member 18 is made larger than the gap A between the top of the cutting teeth and the bottom face of the pressing member 18, even the last lump of the food, which is not smoothly ground and is shaped in flakes of the thickness of the gap A, is easily passed to the peripheral wall of the pot part 9, and further to the filter 7 by the centrifugal force.

Since the cutting plate 12 is secured to the bottom of the pot part 9 with the water-tight construction, there is no danger that any of the juice will remain in uncleanable gap under the cutting plate 12.

The peripheral wall 9' of the pot part 9 is slightly divergent in the upper direction, and the height thereof is selected larger than the gap A, and, therefore, centrifugal motion of the ground food moving from the cutting plate is stopped by collision of the ground food at the peripheral wall 9'. Therefore, the ground food, which is a mixture of the pulp or solid component and the juice loses its centrifugal speed at the peripheral wall 9' and subsequently is pushed to the filter 7 at a slow speed. Because of difference in friction, the juice flows faster than the solid component in traveling on the filter part 7. Since the initial speed of the ground food on the filter 7 is small, its average speed on the filter 7 is also moderate. Accordingly, the retention time of the ground food on the filter 7 will be increased, thereby assuring a high extraction rate.

The angle α (shown in FIGS. 8 and 9), which is the generator of the peripheral wall with respect to the axis of the shaft, considerably influences the juice extraction rate. When the angle α is negative, namely when the peripheral wall 9' is convergent to the upper direction, a large amount of ground food remains on the inside face of the peripheral wall 9', while some part of the large amount of the food is intermittently discharged toward the filter 7. Such intermittent and partial discharge of the food causes sudden shock and weight imbalance of the basket and hence irregular vibration of the basket, thereby damaging the clutch, base and motor. Moreover, such intermittent discharge of the large amount of the food causes decrease in the extraction rate. Furthermore, an upwardly converging pot is very difficult to make by press work of a metal plate.

On the other hand, when an upward diverging peripheral wall of the pot part 9, corresponding to a positive α angle, is used, the flow speed of the ground food is influenced by the angle α. Namely, when the angle α of the peripheral wall is large, the flow speed becomes fast, thereby decreasing the extraction rate, and moreover, the function of the peripheral wall of the pot part 9 is diminished.

Figure 9:
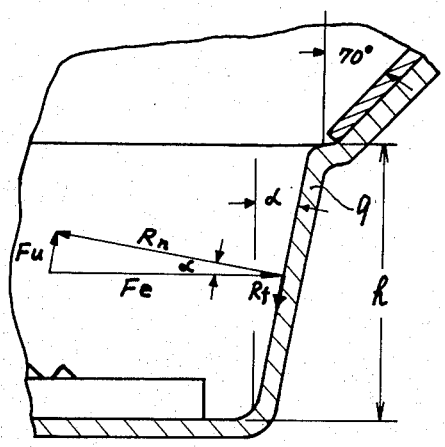
FIG. 9 is an enlarged partial elevation view of a bottom part of the basket.

Now, the relation between the inclination angle α and the motion of the food is elucidated further referring to FIG. 9 showing various forces. Providing that the ground food collides with the peripheral wall 9' and stops there once, the force F which drives the food along the surface of the peripheral wall 9' is given by:

$$F = Fu - Rf, \quad (1)$$

wherein:
Fu: a component of the centrifugal force in the direction along the inner surface of the peripheral wall 9'.
Rf: a resistive force of motion of the food.
The components Fu and Rf can be written as:

$$Fu = Fe \cdot \sin \alpha \quad (2),$$

$$Fr = \mu Rn = Fe \cos \alpha \quad (3),$$

wherein:
Fe: the centrifugal force,
μ: coefficient of dynamic friction,
Rn: reaction force by the peripheral wall 9'.
α: inclination angle α against the axis.
The centrifugal force Fe can be written as:

$$Fe = mr^2 \omega, \quad (4),$$

wherein:

m: mass of the food deposited on the wall 9'.
r: radius of the wall 9',
ω: angular velocity of the rotation.

Accordingly, from the equations (1), (2), (3) and (4), the following equation holds.

$$F = Fe \cdot \sin\alpha - \mu Fe \cos\alpha \quad (5)$$
$$= Fe (\sin\alpha - \mu \cos\alpha).$$
$$= mr\omega^2 (\sin\alpha - \mu \cos\alpha).$$

Since the ground food contains much juice and has very small value of μ, the equation (5) can be written as:

$$F = mr\omega^2 \sin \alpha.$$

Since the angular velocity ω and the radius r are almost constant, the force F which drives the food toward to the filter 7 is given by:

$$F = K \sin \alpha. \quad (6),$$

where K is a constant.

Namely, the speed of food discharged from the peripheral wall 9' to the filter 7 is defined by the angle α. For the range where the angle α is small, the value sin α considerably changes for a change of α, and therefore the driving force F is dependent on the angle α. When the angle α exceeds a certain angle then the driving force (upward force) F overcomes gravity force of the ground food, and, therefore, the ground food becomes accelerated toward the filter 7. When the angle α considerably exceeds the threshold angle, then the speed of the food discharged from the peripheral wall 9' to the filter 7 becomes very fast thereby diminishing any speed controlling function of the peripheral wall 9' hence decreasing the juice extraction rate. In actual operation, because the continuous colliding of ground food with the peripheral wall 9' by the centrifugal force pushes up the previously deposited food, and the food is likely to be more accelerated upward to the filter 7.

Figure 10:
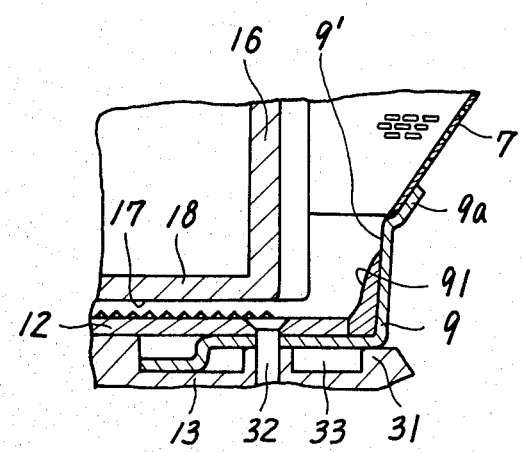
FIG. 10 is a schematic enlarged partial sectional elevation view of the basket.

Next, the effect of the height h of the peripheral wall is elucidated. The food cut by the teeth 12' and ground between the teeth plate 12 and the pressing member 18 is released out of the gap under the pressing member 18 and thrown onto the peripheral wall not only horizontally, but a part of the food is thrown slightly upward. Therefore, if the height h is low, the slightly upward discharged portion directly lands on the filter 7, and will continuously slide upward on the filter, not losing its centrifugal speed by crashing on the peripheral wall 9'. Therefore, a basket with low h will have a low extraction rate. For some kind of food, such as the carrot and cabbage, there is a tendency that ground food thereof is likely to stick on the peripheral wall 9' as shown in FIG. 10, where the deposited food forms a secondary inclined wall 91 which will fail to reduce or eliminate the centrifugal speed of the ground food and hence adversely affect the extraction rate. On the other hand, if the peripheral wall 9' is too high, an excessive amount of the ground food thickly piles on the peripheral wall and some part of the large amount of the food is intermittently discharged toward the filter 7, thereby also decreasing the extraction rate and causing undesirable vibration.

Some test data of examples of the basket 10 are elucidated hereinafter referring to the drawings 11 to 18.

| Device | |
|---|---|
| Speed of rotation of the basket | 11,500 rpm |
| Fileter of the frustum of cone shape: | |
| lower diameter | about 8 cm |
| upper diameter | about 14 cm |
| length of the generator | about 3.5 cm |
| angle of the generator to the shaft | 35° |
| perforation of the filter | 0.2mm × 2.2mm |
| total area of the perforation | 3,200 mm² |
| Diameter of the pot part | 8 cm |

Variables

Angle α of the peripheral wall 9' of the pot part 9 and, height c from the bottom of the food feeding duct 18 to the top of the peripheral wall 9'.

Sample foods tested:
(1) Fruit A—apple as ordinary fruit,
(2) Fruit B—orange as juicy fruit,
(3) Vegetable A—cabbage as ordinary vegetable,
(4) Vegetable B—carrot as pulpy and less juicy vegetable.

Test results:

FIGS. 11 to 14 are charts of curves showing relation between the angle α and the extraction rate for the above-mentioned sample foods (1), (2), (3) and (4), wherein the parameters are height c.

FIGS. 15 to 18 are charts of curves showing relation between the height c and the extraction rate for the above-mentioned sample foods (1), (2), (3) and (4), wherein the parameters are angle α.

Summarizing the above-mentioned test data shown by the curves, it is found that for the fruits the extraction rate is greatly influenced by the angle α, but the height c does not have much relation with the extraction rate. Suitable value of the angle α is between −3° and 10°, and more preferable range of the angle α is between 0° and 6°. The optimum range is between 2° to 4°. As already elucidated, the negative value of the angle α is not suitable for practical use, and, therefore, practical range for α is 0° to 6°. Suitable values of the height c (from the bottom of the food feeding duct 18 to the top of the peripheral wall 9') are 2 mm to 18 mm.

For the vegetables, both the angle α and the height c considerably influence the extraction rate. The practically usable range of the angle α and the height c for the vegetables are 0° to 6° and 6 mm to 14 mm, respectively. This range is also a very useful range for the fruits.

As shown from the curves of FIGS. 11 to 18, by providing the pot part 9 in a manner to have the height c of 6 mm to 14 mm and the angle α of 0° to 6°, the juice extraction ratio can be increased and the optimum angle α being between 2° and 4° as noted above.

Figure 19:
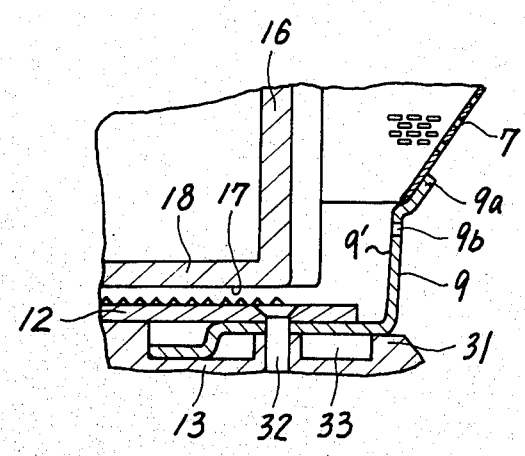
FIG. 19 is a schematic enlarged partial elevation view of a basket of a modified embodiment.

FIG. 19 shows a modified embodiment of the present invention wherein the peripheral wall 9' of the pot part 9 has a certain number of small holes 9b, which are of the same size with or larger than the perforations of the filter 7. Other parts are made similar to the foregoing example.

By connecting the motor to an electric supply, the motor 1 rotates at a high speed, for example, 11,500 rpm, thereby rotating the rotatable table 6, hence transmitting the rotation through the base 13 to the basket 10.

Then, food such as fruit or vegetable is fed into the feeding duct 16, and its pushed down on the cutting plate 12. The ground food which contains juice and pulp is then sent by centrifugal force to the peripheral wall 9' of the pot part 9. The ground food crashes on the peripheral wall 9' and loses centrifugal motion thereby remaining on the substantially vertical peripheral wall 9' for a short period. Since the pulpy component of the ground food remains for a short period, the juice and very small sized pulpy component is discharged from the small holes by the centrifugal force into the juice collecting space 21. Ground food successively sent by the centrifugal force to the peripheral wall 9' of the pot part 9 pushes the previously sent food out of the pot part 9 onto the filter 7, where the juice is further filtered away into the juice collecting space 21 and sent to the receiving cup 26 through the drain 23. The remaining pulp is sent outward on the basket 10 by a component of the centrifugal force and discharged from the flange 8 into the sump space 22.

Since the food remains a certain time period on the peripheral wall 9', the food receives a considerable centrifugal action there. Since, holes of similar size with or larger than the perforations on the filter are provided on the peripheral wall, very small sized pulp pieces of such pulpy fruit as banana of the size of less than several hundred micro-meter pass the holes. Mixing of such small sized pumps provides the juice with a fresh taste and nourishment.

The resultant total extraction rate of this embodiment is very high.

What is claimed is:

1. In a juice extractor including:
a rotatable centrifugal basket having a base, an axis of rotation and a filter portion in the shape of an inverted frustum of a cone, said filter portion having an open end of a selected diameter and a lower end of smaller diameter, said base having an inner face having cutting teeth thereon,
a food feeding duct extending vertically above said inner face with a selected gap between the bottom end of said feeding duct and said inner face of said base of said basket,
a motor for rotating said basket at high speed,
the improvement comprising:
said lower end of said filter portion of said basket being connected to said base of said basket and said base constituting a cylindrical-shaped pot part defined by a substantially vertical imperforate peripheral wall, said peripheral wall having a vertical height such that the top edge of said peripheral wall is located above and higher than the level of the bottom end of said food feeding duct by from 2–18 mm.

2. In a juice extractor including:
a rotatable centrifugal basket having a base, an axis of rotation and a filter portion in the shape of an inverted frustum of a cone, said filter portion having an open end of a selected diameter and a lower end of smaller diameter, said base having an inner face having cutting teeth thereon,
a food feeding duct extending vertically above said inner face with a selected gap between the bottom end of said feeding duct and said inner face of said base of said basket,
a motor for rotating said basket at high speed,
the improvement comprising:
said lower end of said filter portion of said basket being connected to said base of said basket and said base constituting a cylindrical-shaped pot part defined by a substantially vertical imperforate peripheral wall, said peripheral wall having a vertical height such that the top edge of said peripheral wall is located above and higher than the level of the bottom end of said food feeding duct by from 2-18 mm, said peripheral wall having a generator line that makes an angle of 87° to 100° with said inner face of said base, thereby retaining ground food discharged from said cutting teeth at a predetermined time period for the purpose of extraction of juice from said ground food under the centrifugal force.

3. In a juice extractor including:

a rotatable centrifugal basket having a base, an axis of rotation and a filter portion in the shape of an inverted frustum of a cone, said filter portion having an open end of a selected diameter and a lower end of smaller diameter, said base having an inner face having cutting teeth thereon, a food feeding duct extending vertically above said inner face with a selected gap between the bottom end of said feeding duct and said inner face of said base of said basket, a motor for rotating said basket at high speed, the improvement comprising:

said lower end of said filter portion of said basket being connected to said base of said basket and said base constituting a cylindrical-shaped pot part defined by a substantially vertical imperforate peripheral wall, said peripheral wall having a vertical height such that the top edge of said peripheral wall is located above and higher than the level of the bottom end of said food feeding duct by from 2-18 mm, said peripheral wall having a generator line that makes an angle of 87° to 100° with said inner face of said base, thereby retaining ground food discharged from said cutting teeth at a predetermined time period for the purpose of extraction of juice from said ground food under the centrifugal force, and a peripheral gap which is provided between the inner side of said peripheral wall and outside surface of said food feeding duct being larger than said gap between said inner face of said base of said basket and the bottom end of said food feeding duct, said feeding duct having a pressing member attached thereto.

4. In a juice extractor including:

a rotatable centrifugal basket having a base, an axis of rotation and a filter portion in the shape of an inverted frustum of a cone, said filter portion having an open end of a selected diameter and a lower end of smaller diameter, said base having an inner face having cutting teeth thereon, a food feeding duct extending vertically above said inner face with a selected gap between the bottom end of said feeding duct and said inner face of said base of said basket, a motor for rotating said basket at high speed, the improvement comprising:

said lower end of said filter portion of said basket being connected to said base of said basket and said base constituting a cylindrical-shaped pot part defined by a substantially vertical, imperforate peripheral wall, said peripheral wall having a vertical height such that the top edge of said peripheral wall is located above and higher than the level of the bottom end of said food feeding duct by approximately 10 mm, said peripheral wall having a generator line that makes an angle of approximately 3° with said inner face of said base, thereby retaining ground food discharged from said cutting teeth for a predetermined time period for the purpose of extraction of juice from said ground food under the centrifugal force, and a peripheral gap provided between the inner side of said peripheral wall and outside surface of said food feeding duct being larger than said gap between said inner face of said base of said basket and the bottom end of said food feeding duct, said feeding duct having a pressing member attached thereto.

5. The juice extractor of claims 1, 2, 3, or 4 wherein said cutting teeth are disposed in nearly radial rows on said inner face of said base with the teeth at the same radius from the drive shaft lagging behind the teeth located at a larger radial distance from the drive shaft with respect to the direction of rotation of the basket.

6. The juice extractor of claims 1, 2, 3, or 4 wherein said cutting teeth are formed on a metal disc which is fixed on said inner face of said base of said basket, the bottom of which is supported on a rotatable table having a circularly formed protrusion on the periphery thereof, said circular protrusion having a diameter larger than that of said disc which pushes against the peripheral part of the bottom of said base of said basket in a manner that the peripheral part of the inner face of the base of the basket is slightly raised thereby tightly contacting the lower periphery of said metal disc.

7. The juice extractor of claim 6, wherein said protrusion protrudes to a greater extent than the other parts of said table.

8. The juice extractor of claims 1, 2, 3, or 4 wherein the inner face of the connection of said filter portion and said base is made smooth by offsetting either one of said filter portion and said pot part at an overlapping part of the connection.

9. The juice extractor as claimed in claims 1 or 2 wherein a peripheral gap which is provided between the inner side of said peripheral wall and outside surface of said food feeding duct is larger than said gap between said inner face of said base of said basket and the bottom end of said food feeding duct, said feeding duct having a pressing member attached thereto.

10. The juice extractor of claims 3 or 4 wherein the pressing member which is situated at a position downstream of said food feeding duct with respect to the rotation of said basket, has a bottom face spaced from said cutting teeth with a selected gap.

11. The juice extractor of claim 10 wherein a space is provided in said basket and which is defined by a side wall of said pressing member, on the downstream side thereof relative to the direction of rotation of said basket, by an outside wall of said feeding duct which is located on the upstream side thereof relative to the direction of rotation of said basket and by said peripheral wall of said pot part.

12. A juice extractor as claimed in claims 1, 2 or 3 wherein said peripheral wall diverges upwardly and has a generator line that extends at an angle of from 0° to 10° relative to said axis of rotation of said basket.

13. The juice extractor as claimed in claim 1, 2 or 3 wherein said peripheral wall diverges upwardly and has a generator line that extends at an angle of from 2° to 4° relative to said axis of rotation of the basket.

14. The juice extractor as claimed in claims 1, 2 or 3 wherein said peripheral wall diverges upwardly and has a generator line that extends at an angle of from 0° to 6° relative to said axis of rotation of said basket and said top edge of said peripheral wall is higher than the bottom edge of said food feeding duct by 6 mm to 14 mm.

* * * * *